United States Patent [19]
Hahn

[11] 3,896,658
[45] July 29, 1975

[54] CONTROLLED LOW-TEMPERATURE COOLING APPARATUS

[75] Inventor: Mahn Hee Hahn, Washington, D.C.

[73] Assignee: The United States of America as represented by the Secretary of Commerce, Washington, D.C.

[22] Filed: Oct. 29, 1973

[21] Appl. No.: 410,680

[52] U.S. Cl. ............................... 73/17 A; 62/383
[51] Int. Cl. .......................................... G01n 25/66
[58] Field of Search ...................... 73/17 A; 62/383

[56] References Cited
UNITED STATES PATENTS

| | | | |
|---|---|---|---|
| 2,707,870 | 5/1955 | Edmondson | 62/383 |
| 2,951,360 | 9/1960 | Sampson et al. | 73/15 |
| 3,006,611 | 10/1961 | Isham | 62/383 X |
| 3,045,980 | 7/1962 | Isham | 62/383 X |
| 3,064,135 | 11/1962 | Roetter et al. | 73/17 X |
| 3,083,565 | 4/1963 | Jennings et al. | 73/17 |

*Primary Examiner*—Herbert Goldstein
*Attorney, Agent, or Firm*—David Robbins; Alvin J. Englert

[57] ABSTRACT

A housing contains an outer metal block for contacting an object to be cooled. An inner metal block is maintained in constant contact with a cryogen such as Dry Ice or liquid nitrogen so that it assumes a low temperature. The blocks are separated by a gap which provides a variable thermal resistance between the blocks. Thus, while the inner block is maintained at approximately the temperature of the selected cryogen, the outer block can readily be adjusted to any temperature between ambient and the inner block temperature by varying the gap between the blocks.

7 Claims, 2 Drawing Figures

CONTROLLED LOW-TEMPERATURE COOLING APPARATUS

FIELD OF THE INVENTION

The present invention relates to cooling apparatus, and more particularly to low-temperature cooling apparatus.

BRIEF DESCRIPTION OF THE PRIOR ART

In determining the dew point of water or other vapors inside a double pane insulating glass unit, it is necessary to cool one surface of the unit until condensation appears on the inner surface. The prior cooling devices typically comprise a vessel filled with a solvent such as acetone or alcohol. The vessel has a flat surface which is positioned against a surface of the insulating glass unit. Dry Ice is dropped into the solvent thereby cooling the flat surface of the vessel which contacts the glass surface. The Dry Ice must be added continuously, however, in order to maintain the desired temperature at the contacting surface of the vessel, making it difficult to control the temperature to within ±5°F. Also, most prior cooling devices are designed for testing insulating glass units in the horizontal orientation, and therefore are placed on the unit, covering the area where condensation forms. To observe this area, the cooling vessel must be removed from the glass unit or a mirror must be placed beneath the unit. Removal of the vessel often causes ambient moisture to rapidly condense on the outer surface of the glass unit, thereby obscuring any condensation on the inner surface. In addition, the cooled glass surface is warmed by the ambient temperature when the vessel is removed, and it is further warmed if, as is usually done, solvent (e.g., acetone or alcohol) is sprayed on the glass to clear the condensed ambient moisture. This warming reduces the accuracy of the measured temperature of the glass surface, and adversely effects the accuracy and reproducibility of the dew point measurements.

BRIEF DESCRIPTION OF THE PRESENT INVENTION

The present invention in brief includes a housing, a first metal block which contacts the glass or other object to be cooled, a second metal block which is spaced from the first by a variable gap, and a container for a cryogen which maintains the second block at the temperature of the cryogen. The present device is placed on a table or other suitable support and the insulating glass assembly is then positioned on the device. Accordingly, the formation of dew can be easily noticed without removing the device from the glass assembly, thereby avoiding the problems incurred by the prior coolers. By properly locating the cryogen vent opening, the device may be mounted against a glass pane positioned at any angle between horizontal and vertical, making it particularly useful for checking the dew point of installed glass. By a simple adjustment of the variable gap, the heat transfer from the glass contacting block can be varied, which results in a corresponding variance of the test surface temperature. In a normal test procedure, the temperature of the test surface is changed until the dew point is reached. This determination can be made rapidly with convenience and accuracy that cannot be equaled by the prior art. The test surface temperature can readily be maintained within ±0.1°F and the temperature can easily be repeated.

Although the previous discussion is directed to the utilization of the present apparatus for determining the dew point of an insulated glass assembly, it should be clear that the device may be used to cool any object. As the following discussion makes clear, an instantaneous temperature reading of the test area is easily made while the device maintains contact with an object. Accordingly, the response of various materials to low temperatures may be made by employing the present device. However, for purpose of explanation only, the following discussion will relate to utilization of the present invention to determine the dew point of an insulated glass assembly.

The above-mentioned objects and advantages of the present invention will be more clearly understood when considered in conjunction with the accompanying drawings, in which:

DETAILED DESCRIPTION OF THE INVENTION

Figure 1:
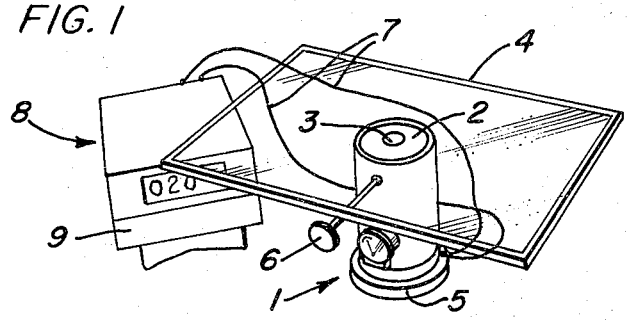
FIG. 1 is a perspective view of an apparatus embodying the present invention, shown determining the dew point of an insulated glass assembly.

The present apparatus 1 shown in FIG. 1 comprises a cylinder having an upper flat annular end plate 2 with a central opening therein to permit the passage of a spring loaded probe or block 3 therethrough. An insulated glass assembly 4 is positioned on the device so that the weight thereof depresses the spring loaded block 3 to place the same in a coplanar relationship with the plate 2. Extremely low temperatures from a cryogen contained within the device 1 cools the block 3. As a result, the area of the glass pane contacting the block 3 will likewise become chilled. By adjusting the annular ring 5, an internal adjustment is made, as will be explained hereinafter, to cause a greater or lesser cooling effect. Accordingly, the temperature of the block 3 may be varied by adjusting the ring 5. By sufficiently cooling the pane of glass resting upon the device 1, the dew point will be arrived at. This becomes manifest by the formation of condensation between the two layers of glass that forms the assembly 4. A stem type thermometer 6 contacts the body of the block 3 and permits a visual readout of the temperature thereof. A more precise measurement may be made by inserting thermocouple wires or other suitable electrical temperature measuring means into the block 3, the wires being connected to a digital voltmeter 8 that has a digital display 9 for temperature readout.

Figure 2:
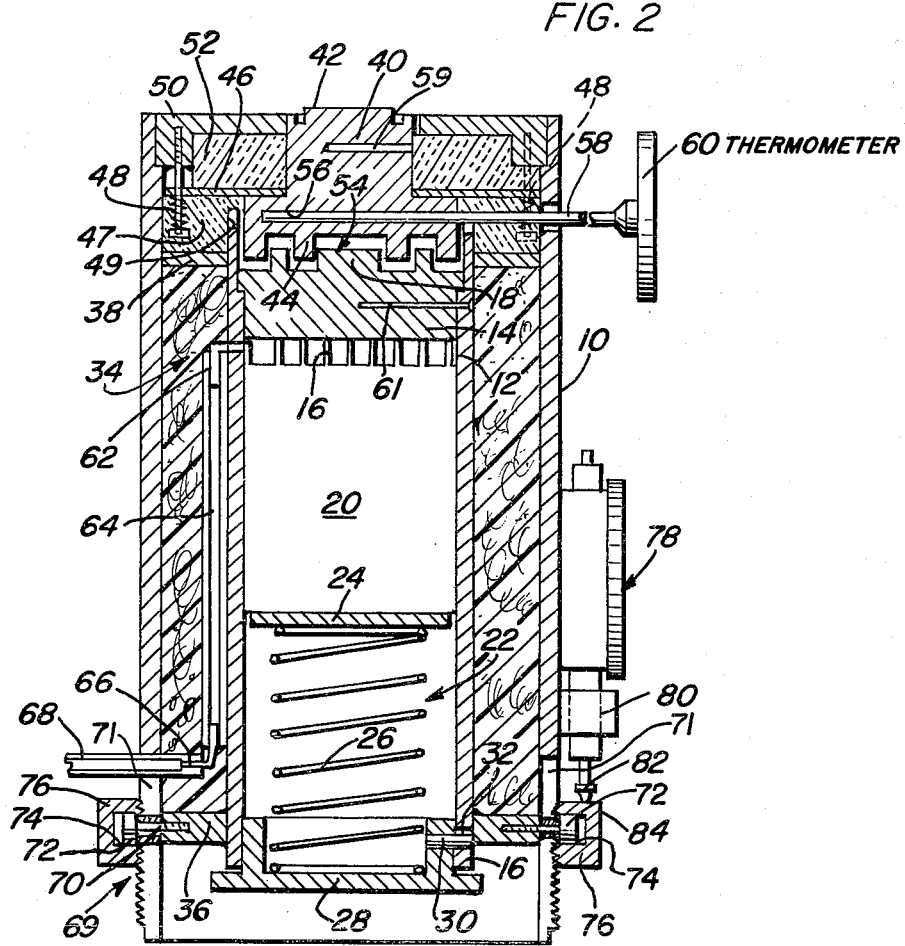
FIG. 2 is a sectional view through the apparatus, illustrating the internal components.

Referring to FIG. 2, a hollow cylinder 10 is seen to form the housing for the interior components of the invention. The cylinder 10 may be fabricated from a suitable insulator material such as Bakelite. A second hollow insulator cylinder 12 is coaxially mounted within the first cylinder 10. It may also be fabricated from Bakelite. At the upper end of the hollow cylinder 12 is a metal member 14 that is suitably secured to the inward wall of the cylinder 12. The member 14 must be fabricated from a thermally conductive material so that an efficient heat transfer may occur between Dry Ice 20, packed against the member 14, and an air gap generally indicated by reference numeral 54, which will be discussed in greater detail hereinafter. The lower illustrated end of the member 14 has criss-cross grooves 16 formed therein so that a greater surface area is created at the interface between the member 14 and the Dry Ice 20. At the upper end of the member 14 are circular ridges 18 which likewise create a greater surface area across which heat transfer may take place from the air gap 54.

Spring loaded means 22 are provided to insure that the Dry Ice 20 is continually packed up against the upper member 14, until the entire supply of Dry Ice is sublimed. Means 22 includes a disc member 24 which contacts the lower end of the dry ice 20 and pushes it toward the member 14 in response of the urging of coil spring 26. The lower end of the spring 26 is contained within a recess in an end cap 28. The end cap 28 has a number of pins 30 extending outwardly therefrom for removable engagement with a slot 32.

The end cap 28 is removed, along with the attached spring 26 and attached disc 24, when a new charge of Dry Ice is to be installed. When a sufficient quantity of Dry Ice is within the device, the means 22 are reinstalled and the end cap 28 secured.

To further insulate the Dry Ice charge 20, a suitable insulating jacket generally indicated by reference numeral 34 is provided on the exterior of the hollow cylinder 12. This jacket may be fabricated from a foam plastic.

In order to properly position the inner hollow cylinder 12 within the housing 10, an annular plate 36 is suitably secured at the radially inward surface to the cylinder 12 while the outward surface contacts the inner wall of the housing 10. Similarly the end portion of the cylinder 12 has a plate 38 secured thereto, the outward edge of the plate 38 contacting the inner wall of the housing 10.

Another thermally conductive member 40 is provided adjacent the member 14, and is adjustably positioned with respect to the member 14. The member 40 has a contact surface 42 that extends outwardly from the upper end of the housing. The contact surface 42 is positioned against an object to effect heat transfer therefrom. In the case of testing insulated glass assemblies, the object will be a pane of glass. Heat transfer from the pane to the member 40 occurs to a sufficient degree causing condensation of water on a test area of the pane which contacts the surface 42. The surface 42 is highly polished and mirror-like and is planar. These qualities ensure maximum heat transfer between the surface 42 and the object which it contacts. The mirror-like surface permits easy sighting of condensation on a glass pane contacting the surface 42. The opposite end of the member 40 has circular ridges 44 which fit between the ridges 18 of member 14. Thus the member 14 may be brought into contact with member 40, thereby cooling the surface 42 at a maximum rate. The rate of cooling can be slowed down by moving members 14 and 40 apart to create a variable air gap 54. The presently disclosed structure is capable of cooling the member 40 to any temperature from ambient to the temperature of the cryogen, which for Dry Ice is −109°F. Further insulating is provided by a foam ring 47 that is positioned above the plate 38 and radially outwardly from the member 40. The upper end of the cylinder 12 moves in and out of an annular groove 49, formed in the foam insulator 47. In order to spring load the member 40 so that the surface 42 may be depressed to lie coplanar with the upper end surface of end plate 50, a spring assembly 48 is provided which contacts a thin support member 46 which in turn is fixed to a shoulder of member 40. As a result, the member 40 is resiliently mounted to the housing. When an object is placed over the upper end of the housing, the member 40 and attached ring 46 are forced downwardly against the action of the spring assembly 48 and the foam ring 47 until the surface 42 of member 40 is depressed to lie in coplanar relation with the end plate 50, thus providing a constant contacting force against the object. It will be noticed that an insulator ring 52 is positioned between the support plate 46 and the end plate 50 to further insulate the body of member 40. An elongated bore 56 is formed in the member 40 to receive the stem 58 of a thermometer 60. At the outward end of the stem is the thermometer dial that permits direct reading of the temperature of the member 40. A smaller bore 59 is formed in the central portion of the member 40 and another small bore 61 is formed in the member 14. These bores receive thermocouple wires (not shown) which are passed outwardly through the housing and thereafter may be connected to a digital voltmeter for producing a precise and accurate readout, as illustrated in FIG. 1.

To vent sublimed carbon dioxide gas from the device, a vent 62 communicates with the criss-crossed grooves 16 of member 14. The vent 62 further communicates with a tube 64 that extends downwardly along the hollow cylinder 12. An elbow tube 66 completes the communication between tube 64 and an additional tube 68 which passes through the wall of the hollow cylinder 12 to vent exhausting carbon dioxide to the atmosphere.

Reference numeral 69 generally denotes an adjustable ring assembly that adjustably positions the inner hollow cylinder 12 so that the gap 54 may be varied. The adjusting assembly 69 includes a number of spaced pins 70 that are received within the plate 36. Each pin extends outwardly through a slot formed in the housing and terminates outwardly in a bearing 72. An annular ring 76 is threadably mounted to the lower end portion of the housing cylinder 10. A race 74 is formed in the annular ring to receive the bearing 72. Utilization of bearings permits effortless turning and adjusting of the inner cylinder 12. As will be appreciated, as the race 76 is turned the cylinder 12 will be moved upwardly or downwardly to produce a corresponding change in the gap 54. By turning the ring 76 the member 14 may be moved toward the mating member 40 to create a variable spaced gap which increases the heat transfer rate, and commensurately the temperature of the member 40. Thus, an object resting upon the device may be subjected to varying temperatures. When the gap is completely closed, the members 14 and 40 are in contact and maximum heat transfer occurs. The members will be in temperature equilibrium and after just a few minutes, the block 40 will maintain a very low temperature to cool an object that is placed on top of the device. In the case of insulated glass, the temperature may be lowered until condensation forms to indicate arrival at the dew point.

As a convenience, a displacement gauge 78 may be mounted to the outside of the cylinder housing 10 by means of a clamp or other suitable fastener 80. The probe 82 is positioned against the upper surface 84 of the annular ring 76. The annular ring may be turned until the members 14 and 40 touch. The displacement gauge 78 is then calibrated to a zero position. Afterwards, as the gap 54 is changed, a direct reading may be made on the displacement gauge 78. As a result, experiments may be repeated by knowing the corresponding reading of the displacement gauge 78 for a particular test point.

Again, it is to be stressed that although the present description is directed toward the testing of insulating glass, the present device has applications with other objects and materials. Further, although the described device is used in conjunction with determining the dew point of insulated glass in a experimental set-up, the present device may be set-up on a production line to check objects such as insulated glass as they come off the line. In this regard, the device may be used as a "go–no go" quality control test. This is simply done, in the case of checking insulated glass, by positioning the device at the end of a production line. The temperature of member 40 would be set at a predetermined temperature that would not cause condensation on a glass pane of a well insulated glass assembly. By use of human observation, or automated methods the occurrence of condensation can be observed.

It should be understood that the invention is not limited to the exact details of construction shown and described herein for obvious modifications will occur to persons skilled in the art. For example, it will be obvious that cryogens such as liquid nitrogen or liquid air (not shown) could be used instead of Dry Ice to cool the metal block 14. In this connection the term "cryogen" is to be understood to mean any substance which is a gas at room temperature but a liquid or solid at temperatures well below room temperature. Since most cryogens are liquids, it is obvious that the disc 24 and spring 26 may be dispensed with and that the cryogen container—comprising the cylinder 12, metal block 14 and cover 28—should be constructed in a fluid-tight manner and of metal, in order to efficiently conduct heat absorbed by the block 14 to the cryogen in the container. It is also obvious that the cover 28 may be provided with insulation (not shown) similar to the insulation placed around the cylinder 12.

Although the gap 54 between the blocks 14 and 40 is shown as an air gap, it will be obvious to those skilled in the art that the apparatus could readily be modified so that the gap contains any selected gas, liquid, or compressible solid such as polystyrene foam (not shown). The gas or liquid would of course be shunted into a balloon-like reservoir (not shown) when the gap is narrowed. It will also be obvious that the metal block 40 may be provided with electrical heating means (not shown) to rapidly raise its temperature, should such be desirable; and with a cavity (not shown) in its upper surface 42 to receive small objects such as biological samples which are to be examined at low temperatures with the aid of a microscope or other instrument.

From the foregoing it will be seen that the present invention provides a cooling device which is compact, self-contained, and capable of quickly cooling an object to any desired temperature between ambient and the temperature of the cryogen contained therein. The device is easy to operate and is characterized by high accuracy and repeatability.

I claim:

1. A device for cooling an object comprising: wall means including side and at least one end wall means defining a housing; said end wall means having an opening therein; a first thermally conductive member located within said housing and including a portion extending through said opening for contacting an object to be cooled; a second thermally conductive member located in said housing in adjustably spaced relation to said first member for creating a gap therebetween; said first and second members having facing surfaces having mating grooves and projections for increasing the surface area of the gap across which thermal transfer can occur; said mating grooves and projections extending axially of the axis of said housing; means located within said housing for cooling said second member, means for effecting relative axial movement between said first and second members for varying said gap; and means for measuring the temperature of said first member.

2. The device of claim 1 wherein said cooling means comprises: a hollow cylinder for receiving said second member at one end thereof, an intermediate section of the cylinder receiving a predetermined quantity of a cryogen therein.

3. The device as claimed in claim 1 and said measuring means comprising a thermometer including a stem and a temperature display dial carried thereby, said first thermally conducting member having a transversely extending bore therein, said housing side wall means having an opening therein and said stem being disposed in said bore and projecting through said opening so that said display dial is supported exteriorly of said housing to permit direct temperature readings.

4. The device as claimed in claim 1 and said cooling means comprising a hollow cylinder within said housing having one end adjacent said first members, said second member being carried at said one end of said cylinder, a portion of said cylinder constituting a container for receiving a solid refrigerant therein and the surface of said second member facing any such solid refrigerant having grooves therein to maximize thermal conductivity transfer between any such solid refrigerant and said second thermally conducting member.

5. A device for cooling an object comprising: wall means including side and at least one end wall means defining a housing; said end wall means having an opening therein; a first thermally conductive member located within said housing and including a portion extending through said opening for contacting an object to be cooled; a second thermally conductive member located in said housing in adjustably spaced relation to said first member for creating a gap therebetween; a hollow cylinder within said housing and having one end adjacent said first member; said second member being carried at said one end of said cylinder; a portion of said cylinder adjacent said second means constituting a container for receiving a predetermined quantity of cryogen therein for cooling said second member; said side wall means of said housing having external threads on a portion thereof remote from said one end wall means;

said portion of said side wall means having a plurality of peripherally spaced, longitudinally extending slots therein;

an annular ring having internal threads thereon for threaded engagement with the external threads on said portion of said side wall means;

said annular ring having a circular race therein;

a plurality of rolling contact bearing means disposed in said race, and means connected between said cylinder and bearing means and including portions passing through slots for effecting axial displacements of said cylinder in response to turning movement of said ring so as to vary the gap between said first and second members;

and means for measuring the temperature of said first member.

6. The device of claim 5 and further including a displacement gauge mounted on said housing and responsive to the position of said ring for directly reading the distance of said gap.

7. The device as claimed in claim 5 wherein said first thermally conductive member is resiliently mounted with respect to said end wall means whereby an object contacting said portion of said first thermally conducting member can displace said member inwardly to have the outer surface of said portion lie in coplanar relationship with said end wall means so that said end wall means can serve as a support for such an object.

* * * * *